UNITED STATES PATENT OFFICE.

JAMES H. STEBBINS, JR., OF NEW YORK, N. Y.

DYE-STUFF OR COLORING-MATTER.

SPECIFICATION forming part of Letters Patent No. 254,065, dated February 21, 1882.

Application filed January 16, 1882. (Specimens.)

*To all whom it may concern:*

Be it known that I, JAMES H. STEBBINS, Jr., a citizen of the United States, residing at New York, in the county and State of New York, have invented new and useful Improvements in Dye-Stuffs or Coloring-Matters, of which the following is a specification.

This invention relates to a blue dye-stuff produced by the action of diethylparaphenylendiamine chloride upon an alkaline solution of alphanaphthol in the presence of an oxidizing agent.

In carrying out my invention I take ten pounds of nitroso-diethylaniline chloride, which I dissolve in five hundred pounds of water. To this solution I then add fifteen pounds of zinc-dust and heat the mixture, under constant stirring, to about 60° centigrade, by which the nitroso compound is reduced to diethylparaphenylendiamine chloride. The zinc-dust is then separated by filtering the warm solution, and to this solution I add, under constant stirring, a solution composed of fourteen pounds of alphanaphthol, fourteen pounds of caustic-soda solution, (1.29 specific gravity,) ten pounds of bichromate of potash, and two hundred pounds of water, and then let cool. As soon as this mixture has thoroughly cooled I add thereto, under constant stirring and little by little, enough common acetic acid to render the previously alkaline solution slightly acid, at which point my new coloring-matter is thrown down as a dark-blue precipitate, which I collect on a filter and wash with water until the impurities have been removed. It may then be sold in the shape of a paste.

My new dye-stuff is insoluble in water, but is soluble in alkaline water without changing its color. It is reduced by grape-sugar in an alkaline solution to a leuco base of a dirty greenish color. In this state the dye-stuff has a great affinity to wool, which is readily dyed in it at a temperature of about 150° Fahrenheit. The color on the wool is developed by an oxidizing agent—such as bichromate of potash—into a bright indigo-blue. The so-dyed wool is changed into a light orange color by the application of nitric acid.

My new dye-stuff has basic properties as it dissolves in mineral acids, which, however, in a short time completely destroy it. It is easily soluble in alcohol, and a very decided reaction is obtained by treating the blue alcoholic solution of the dye-stuff with an alcoholic solution of picric acid. The previously blue solution is by this means immediately turned to a bright yellow. Its blue alkaline solution on being treated with oxalic acid turns red and throws out a brown precipitate.

When dry my dye-stuff appears as a dark-blue powder with a bronze luster very similar to Prussian blue.

What I claim as new, and desire to secure by Letters Patent, is—

The blue dye-stuff produced by the action of diethylparaphenylendiamine chloride upon an alkaline solution of alpha-naphthol in the presence of an oxidizing agent, substantially as described.

In testimony whereof I have hereunto set my hand and seal in the presence of two subscribing witnesses.

JAMES H. STEBBINS, JR. [L. S.]

Witnesses:
W. HAUFF,
E. F. KASTENHUBER.